US009448791B1

(12) United States Patent
McFarlane et al.

(10) Patent No.: US 9,448,791 B1
(45) Date of Patent: Sep. 20, 2016

(54) SYNCHRONIZING SOURCE CODE OBJECTS AND SOFTWARE DEVELOPMENT WORKFLOW OBJECTS

(71) Applicant: Amazon Technologies, Inc., Seattle, WA (US)

(72) Inventors: Joshua William McFarlane, Seattle, WA (US); Matthew Roy Noble, Seattle, WA (US); Nicholas Alexander Allen, Seattle, WA (US); Andrew Thomas Troutman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/073,342

(22) Filed: Nov. 6, 2013

(51) Int. Cl.
G06F 9/44 (2006.01)

(52) U.S. Cl.
CPC ........................ G06F 8/71 (2013.01)

(58) Field of Classification Search
CPC ........................................................ G06F 8/71
USPC .................................................. 717/101–178
See application file for complete search history.

(56) References Cited

U.S. PATENT DOCUMENTS

| | | | | |
|---|---|---|---|---|
| 5,909,689 A * | 6/1999 | Van Ryzin | | |
| 6,529,948 B1 * | 3/2003 | Bowman-Amuah | . G06F 9/4435 | 709/217 |
| 6,678,882 B1 * | 1/2004 | Hurley | .................... G06F 8/315 | 717/121 |
| 7,117,052 B2 * | 10/2006 | Lucas | ............. G05B 19/41845 | 700/28 |
| 7,203,938 B2 * | 4/2007 | Ambrose | .................. G06F 8/20 | 717/168 |
| 7,464,386 B2 * | 12/2008 | Millington et al. | .......... 719/331 | |
| 7,729,792 B2 * | 6/2010 | Lucas | .............. G05B 19/41845 | 700/108 |
| 8,341,590 B1 * | 12/2012 | Poole | ........................ G06F 8/71 | 717/101 |
| 8,473,087 B2 * | 6/2013 | Lucas | .............. G05B 19/41845 | 700/108 |
| 8,689,178 B2 * | 4/2014 | Ambrose | .................. G06F 8/20 | 717/108 |
| 8,898,634 B2 * | 11/2014 | Weatherhead | ............ G06F 8/71 | 717/108 |
| 9,047,165 B1 * | 6/2015 | Mosterman | ............... G06F 8/35 | |
| 2002/0004815 A1 * | 1/2002 | Muhlestein et al. | .......... 709/201 | |
| 2002/0029218 A1 * | 3/2002 | Bentley | ............. G06F 17/30144 | |
| 2006/0059465 A1 * | 3/2006 | Kogan | ................ G06F 17/3089 | 717/121 |
| 2006/0101038 A1 * | 5/2006 | Gabriel et al. | ................ 707/100 | |
| 2009/0192849 A1 * | 7/2009 | Hughes | ..................... G06F 8/10 | 705/7.11 |

(Continued)

OTHER PUBLICATIONS

DVCS or a new way to use Version Control Systems for FreeBSD—Ollivier Robert—May 11, 2006.*

(Continued)

*Primary Examiner* — Francisco Aponte
(74) *Attorney, Agent, or Firm* — Lee & Hayes, PLLC

(57) ABSTRACT

Technologies are described herein for synchronization of source code objects and software development workflow objects. Software development workflow objects are identified that are related to source code objects to be synchronized to a development device. The identified software development workflow objects are then stored in a copy of a source control object store that also includes the source code objects to be synchronized. The copy of the source control object store may then be transmitted to the development device for offline use. Tools might also be provided on the development device for utilizing the software development workflow objects stored in the copy of the source control object store maintained by the development device. The copy of a source control object store containing modified source code objects and modified software development workflow objects might also be utilized to synchronize the changes to the objects to an appropriate object store.

21 Claims, 7 Drawing Sheets

(56) References Cited

U.S. PATENT DOCUMENTS

| | | | | |
|---|---|---|---|---|
| 2009/0254572 | A1* | 10/2009 | Redlich | G06Q 10/06 |
| 2011/0179280 | A1* | 7/2011 | Imrey et al. | 713/178 |
| 2013/0074038 | A1* | 3/2013 | Fox et al. | 717/122 |
| 2013/0159365 | A1* | 6/2013 | Boctor et al. | 707/827 |
| 2014/0236843 | A1* | 8/2014 | Bain et al. | 705/301 |
| 2014/0279973 | A1* | 9/2014 | Kelley | G06F 8/71 707/695 |

OTHER PUBLICATIONS

Version Control with Git—Jon Loeliger—O'Reilly Media, Inc.—2009.*

Pro Git—Scott Chacon—Aug. 2, 2010.*

Source Code Control Workflows for Open Source Software—Kevin Gary—Department of Engineering—Arizona State University; Ziv Yaniv, Ozgur Guler, and Kevin Cleary—The Sheik Zayed Intitute for Pediatric Surgical Innovation Children's National Medical Center; Andinet Enquobahrie-Kitware, Inc—Proceedings of the International Conf. on Software Engr.2014.*

Chacon, S. "Pro Git" published by Apress [online][retrieved on Dec. 12, 2013] retrieved from: http://martinez.io/git-distributed-even-if-your-workflow-isnt, 10 pps.

* cited by examiner

US 9,448,791 B1

SYNCHRONIZING SOURCE CODE OBJECTS AND SOFTWARE DEVELOPMENT WORKFLOW OBJECTS

BACKGROUND

Software developers commonly utilize many different types of tools during the development of a software application. For example, software developers might utilize tools for editing source code and compiling the source code into executable code. In addition to these tools, software developers might also utilize other types of utility programs to assist with the development of an application. For example, a developer might utilize a version control system ("VCS") to manage changes made to the source code and other components of the application.

In addition to a VCS, software developers might also utilize various software development workflow systems to manage the workflow of program development. For example, a developer might utilize an issue tracking system to track issues (which might also be referred to as "bugs") within the program being developed. Similarly, the developer might also utilize a software project management system to manage the development timeline and other aspects of the development of a program. A developer might also utilize other software development workflow systems in conjunction with the development of a program.

Some VCSs (which may be referred to herein as a "distributed VCS" or "DVCS") allow a developer to check out and utilize source code objects stored in a source control object store even when a network connection cannot be made to the DVCS. In this way, a developer can utilize and modify source code objects even when their development device is offline from the DVCS. When a connection is reestablished with the DVCS, any changes to the source code objects made by the developer can be synchronized back to the source control object store. Most software development workflow systems, however, do not provide such an offline mode of operation. Consequently, it may be difficult and/or time consuming for a developer to update related software development workflow systems following the offline use and/or modification of source code objects maintained by a DVCS.

It is with respect to these and other considerations that the disclosure made herein is presented.

DETAILED DESCRIPTION

Figure 1:
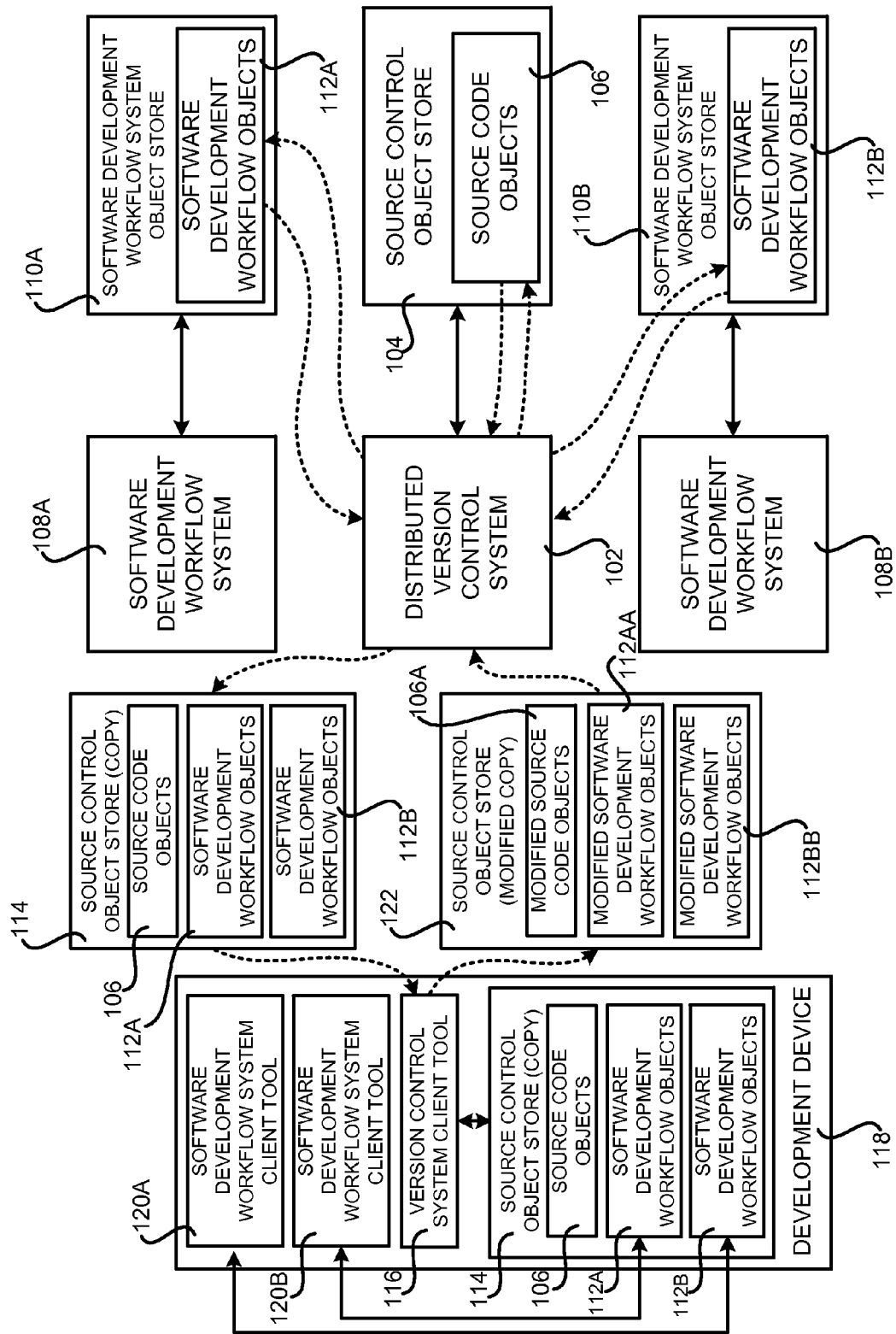
FIG. 1 is a system diagram showing aspects of a mechanism for synchronizing source code objects and software development workflow objects, including several software and hardware components utilized in embodiments disclosed herein.

The following detailed description is directed to technologies for synchronizing source code objects and software development workflow objects. Utilizing the technologies described herein, both source code objects and software development workflow objects can be synchronized to a development device for use in an offline fashion (i.e. when a network connection between the development device and the DVCS is unavailable). After the development device returns online, any modifications to the source code objects and the software development workflow objects can be synchronized to the appropriate object store.

According to one embodiment, a DVCS is provided that includes functionality for managing changes made to source code files and other types of files associated with a program (referred to herein as "source code objects"). The DVCS may store source code objects in a source control object store. The DVCS also provides functionality for allowing a developer to utilize source code objects stored in the source control object store in an offline manner. For example, a copy of a source control object store that includes all or a subset of the source code objects contained in the source control object store can be provided to a development device for use in an offline fashion.

As mentioned briefly above, various software development workflow systems might be utilized in conjunction with a DVCS to manage various aspects of the development of a program. For example, and without limitation, software development workflow systems include issue tracking systems, software project management systems, and deployment systems for deploying programs to various computing systems. The embodiments disclosed herein might also be utilized with other types of software development workflow systems.

Each of the software development workflow systems identified above might store appropriate objects in an associated object store. For example, and without limitation, an issue tracking system may store objects containing data and/or metadata relating to issues in a program (i.e. "issue tracking objects") in an issue tracking system object store. Similarly, a software project management system may store objects containing data and/or metadata relating to the management of a software project (i.e. "project management objects") in a software project management system object store.

The DVCS, or another component, might also be configured to identify software development workflow objects maintained by software development workflow systems that are related to source code objects to be provided to a development device for offline use. For example, the DVCS, or another component, might be configured to identify issue tracking objects and/or project management objects that are related to or otherwise associated with one or more source code objects to be provided to a development device. Other types of software development workflow objects associated with source code objects might also be identified in a similar manner.

Once one or more software development workflow objects have been identified that are associated with source code objects to be synchronized to a development device, the identified software development workflow objects may be stored in the copy of the source control object store to be provided to the development device. In this way, a copy of a source control object store may be generated that includes both source code objects from a source control object store and software development workflow objects from one or more software development workflow object stores. The copy of the source control object store may then be transmitted to the development device for offline use.

In some embodiments, the development device includes tools for utilizing the software development workflow objects stored in the copy of the source control object store maintained at the development device. For example, and without limitation, the development device might be configured with an issue tracking system client tool for utilizing and, potentially modifying, issue tracking objects. Similarly, the development device might be configured with a software project management system client tool for utilizing and, potentially modifying, project management objects. The development device might also be configured to execute a version control system client tool that permits the utilization and modification of source code objects contained in the copy of the source control object store maintained at the development device. Through the use of these tools, a software developer can modify and otherwise utilize the source code objects and the software development workflow objects stored on the development device.

The DVCS, the version control system client tool, or another component, might also provide functionality for merging source code objects and software development workflow objects modified on the development device into their respective object stores. For example, the development device might provide the copy of the source control object store containing modified source code objects and modified software development workflow objects to the DVCS or another component configured to synchronize the changes to the objects to the appropriate object store. In response thereto, the DVCS, or another component, may merge the changes to the source code objects into the original source control object store. The DVCS, or another component, might also merge the changes to the software development workflow objects into an appropriate software development workflow system object store. In this way, both source code objects and software deployment workflow objects can be efficiently provided to a development device, utilized in an offline fashion, and any changes to the objects can be merged into the appropriate object store.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment for the embodiments disclosed herein that includes several components for synchronizing source code objects and software development workflow objects. In particular, the environment shown in FIG. 1 includes a DVCS 102. As discussed briefly above, a DVCS 102 is provided in one embodiment that includes functionality for managing changes made to source code files and other types of files associated with a program (referred to herein as "source code objects 106"). One specific example of a DVCS is the GIT open source distributed version control and source code management system. Other examples of distributed version control systems include, but are not limited to, the MERCURIAL open source distributed version control system and the BAZAAR version control system from CANONICAL, INC.

The DVCS 102 may store the source code objects 106 in a source control object store 104. The source control object store 104 might also be referred to as a "source code repository." The DVCS 102 also provides functionality for allowing a developer to utilize source code objects 106 stored in the source control object store 104 even when a network connection cannot be made between the developer's development device 118 and the DVCS 102. The development device 118 is a computing device, such as a desktop or laptop computer, a tablet device, or a smartphone, configured to execute software components for performing program development. Other types of development devices 118 might also be utilized.

In order to provide functionality for using the source control object store 104 on the development device 118, a copy 114 of the source control object store 104 that includes all or a subset of the source code objects 106 contained in the source control object store 104 can be provided to a development device 118 for use in an offline fashion. A developer may be permitted to specify which of the source code objects 106 are synchronized to the development device 118. As shown in FIG. 1, a version control system client tool 116 might also be provided for execution on the development device 118 that permits the use of the source code objects 106 in the copy 114 of the source control object store 114 stored at the development device 118.

As shown in FIG. 1, the DVCS 102 might also be utilized in conjunction with one or more software development workflow systems 108A-108B (which might be referred to herein individually as "a software development workflow system 108" or in the collective as "the software development workflow systems 108"). As mentioned briefly above, the software development workflow systems 108 provide functionality for managing various aspects of the workflow of software development. For example, and without limitation, the software development workflow systems 108 include issue tracking systems, software project management systems, and deployment systems. The embodiments disclosed herein might also be utilized with other types of software development workflow systems 108.

As also mentioned above, each of the software development workflow systems 108 identified above might store appropriate objects (referred to herein as software development workflow objects 112) in an associated software development workflow system object store 110. For example, the software development workflow system 108A may store software development workflow objects 112A in the software development workflow system object store 110A. Similarly, the software development workflow system 108B may store software development workflow objects 112B in the software development workflow system object store 110B. As will be described in greater detail below, the embodiments disclosed herein provide functionality for enabling the utilization and modification of the software development workflow objects 112 on a development device 118 in an offline fashion. Additional details regarding this process will be provided below.

In order to utilize the functionality provided herein, a developer might utilize the version control system client tool 116, or another component, to request a copy 114 of the source control object store 114 that includes all or a subset of the source code objects 106 contained in the source control object store 104. In response thereto, the DVCS 102, or another component, may create the copy 114 of the source control object store 104 containing the requested source code objects 106. Additionally, the DVCS 102, or another component, might also be configured to identify software development workflow objects 112 maintained by the software development workflow systems 108 that are related in some manner to the requested source code objects 106. For example, the identified software development workflow objects 112 might include data and/or metadata corresponding to the requested source code objects 106.

Once one or more software development workflow objects 112 have been identified that are associated with requested source code objects 106, the DVCS 102 or another component may retrieve the identified software development workflow objects 112 and store the objects 112 in the copy 114 of the source control object store 104 that is to be provided to the development device 118. In this way, the copy 114 of the source control object store 104 is generated that includes both source code objects 106 from the source control object store 104 and software development workflow objects 112 from one or more software development workflow object stores 110. The DVCS 102 or another component may then transmit the copy 114 of the source control object store 104 to the development device 118 for offline use. As illustrated in FIG. 1, the development device 118 receives and stores the copy 114 of the source control object store 104 in a locally available storage device.

As also shown in FIG. 1, the development device 118 might also be configured with software tools for modifying and otherwise utilizing the source code objects 106 and the software development workflow objects 112 stored in the copy 114 of the source control object store 104. For example, and as shown in FIG. 1, the development device 118 might include a version control system client tool 116 that provides functionality for utilizing the source code objects 106 stored in the local copy 114 of the source control object store 104. The version control system client tool 116 might also provide functionality for utilizing and/or modifying the software development workflow objects 112A-112B. For example, and without limitation, the version control system client tool 116 might interact with the software development workflow objects 112A-112B directly or indirectly through the software development workflow system client tools 120A-120B.

The development device 118 might also include a software development workflow system client tool 120A for utilizing the software development workflow objects 112A stored in the local copy 114 of the source control object store 104. Similarly, the development device 118 might also include a software development workflow system client tool 120B for utilizing the software development workflow objects 112B stored in the local copy 114 of the source control object store 104. The tools 116, 120A, and 120B may be configured to permit the utilization of the contents of the copy 114 of the source control object store 104 even when a network connection cannot be established to the DVCS 102.

It should be appreciated that the tools described above might be implemented in various ways using various technologies in different embodiments. For example, and without limitation, the client tools 116, 120A and 120B might be implemented as application programs executing on the development device 118. In another implementation, the client tools 116, 120A and 120B are implemented as Web programs. The client tools 116, 120A and 120B might also provide functionality for both online and offline operation. The functionality described herein as being provided by the client tools 116, 120A and 120B might also be provided by a single software component. Additionally, one or more application programming interfaces ("APIs") might be provided on the development device 118 for accessing and utilizing the contents of the copy 114 of the source control object store 104 stored on the development device 118.

Functionality is also disclosed herein for merging changes to the objects 106 and 112 contained in the copy 114 of the source control object store 104 back into the respective object stores 104 and 110. For example, after a network connection has been established between the development device 118 and the DVC 102, the development device 118 might automatically provide the copy 114 of the source control object store 104 containing modified source code objects 106A and modified software development workflow objects 112AA and 112BB to the DVCS 102 or another component configured to synchronize the changes to these objects to the appropriate object store.

In response to receiving the copy 114 of the source control object store 104 from the development device 118, the DVCS 102, or another component, may retroactively merge the modified source code objects 106A into the original source control object store 104. Similarly, the DVCS 102, or another component, might also retroactively merge the modified software development workflow objects 112AA into the software development workflow system object store 110A and retroactively merge the modified software development workflow objects 112BB into the software development workflow system object store 110B. In this way, both source code objects 106 and software deployment workflow objects 112 can be efficiently provided to a development device 118, utilized on the development device 118 even when a connection cannot be established with the DVCS 102, and any changes to the objects 106 and 112 made on the development device 118 can be merged back into the appropriate object store 104 or 110 retroactively. Additional details regarding this process are provided below with regard to FIGS. 2-6.

It should be appreciated that although FIG. 1 illustrates the DVCS 102 as creating the copy 114 of the source control object store 104 and receiving the copy 114 of the source control object store 104 from the development device 118, other systems and/or components might also perform this functionality. In some embodiments, for example, a component on the development device 118 might be configured to push the modified software development workflow objects 112AA and 112BB into the appropriate software development workflow object store 110A or 110B. Other configurations might also be utilized.

It should also be appreciated that the various components shown in FIG. 1, and the other FIGS., have been simplified for ease of understanding. In this regard, it should also be appreciated that many more computers, software components, networking devices, networks, and other components might be utilized to implement the various embodiments described herein. It should also be appreciated that the embodiments described herein might be implemented utilizing a client and server model or a peer-to-peer model. In the client and server model, one or more servers might be configured to provided the DVCS 102 and to provide the functionality described herein to multiple clients (i.e. development devices 118). In a peer-to-peer model, the development devices 118 might be configured to synchronize changes to objects in a source control object store 104 between one other. Other configurations might also be utilized.

Figure 2:
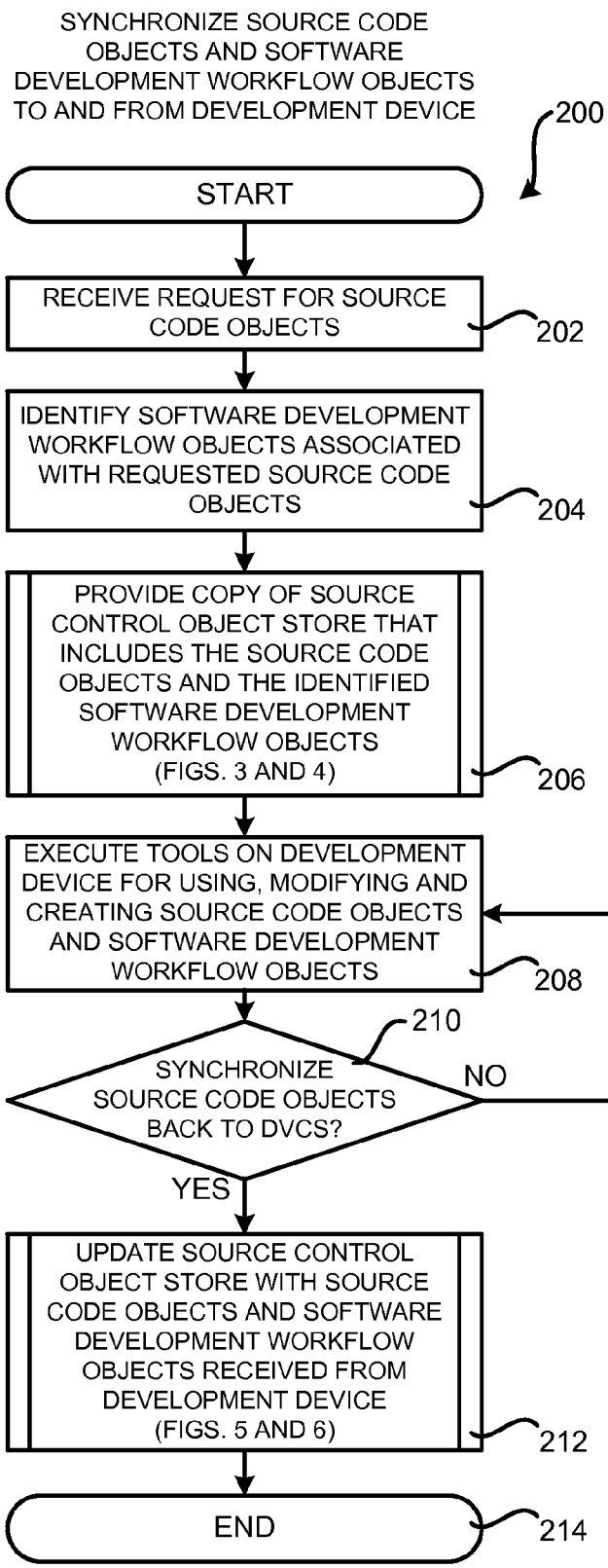
FIG. 2 is a flow diagram showing aspects of one illustrative routine disclosed herein for synchronizing source code objects and software development workflow objects to and from a development device, according to embodiments described herein.

FIG. 2 is a flow diagram showing aspects of one illustrative routine 200 disclosed herein for synchronizing source code objects 106 and software development workflow objects 112 to and from a development device 118, according to one embodiment disclosed herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the DVCS 102 receives a request for one or more source code objects 106 stored in the source control object store 104. For example, and without limitation, a development device 118 may be utilized to provide such a request to the DVCS 102. In response to receiving a request at operation 202, the routine 200 proceeds from operation 202 to operation 204, where the DVCS 102, or another component, identifies one or more software development workflow objects 112 that are related to the requested source code objects 106. For example, and without limitation, the DVCS 102 or another component might search the contents of one or more software development workflow system object stores 110 to identify software development workflow objects 112 that are related to the requested source code objects 106. Other mechanisms might also be utilized to identify related software development workflow objects 112. Once the related software development workflow objects 112 have been identified, the routine 200 proceeds to operation 206.

At operation 206, the DVCS 102, or another component, creates a copy 114 of the source control object store 104 that includes the requested source code objects 106 and the software development workflow objects 112 identified at operation 204. The DVCS 102, or another component, then provides the copy 114 of the source control object store 104 in response to the request received at operation 202. For example, the DVCS 102 might provide the copy 114 of the source control object store 104 to the version control system client tool 116 for local storage on the development device 118. Additional details regarding this process will be provided below with regard to FIGS. 3 and 4.

From operation 206, the routine 200 proceeds to operation 208, where, as described briefly above, software tools may be executed on the development device 118 for utilizing and, potentially modifying, the source code objects 106 and the software development workflow objects 112 stored in the copy 114 of the source control object store 104 maintained at the development device 118. For example, and without limitation, the version control system client tool 116 may be utilized to modify the source code objects 106. Similarly, the software development workflow system client tools 120A and 120B may be utilized to modify the software development workflow objects 112A and 112B, respectively. As also discussed above, the version control system client tool 116 might also be utilized to interact with and/or modify the software development workflow objects 112A-112B. For example, and as also mentioned above, the version control system client tool 116 might interact with the software development workflow objects 112A-112B directly. Alternately, the version control system client tool 116 might interact with the software development workflow objects 112A-112B through an interaction with the software development workflow system client tools 120A-120B.

It should be appreciated that tools other than those specifically identified above might also be provided and utilized on the development device 118 for utilizing and modifying the contents of the copy 114 of the source control object store 104. As discussed above, these tools may be utilized to interact with the contents of the copy 114 of the source control object store 114 even when a network connection cannot be established between the development device 118 and the DVCS 102 and/or the software development workflow systems 108A and 108B.

From operation 208, the routine 200 proceeds to operation 210, where a determination is made as to whether a request has been received to synchronize modified source code objects 106A into the source control object store 104. For example, and without limitation, the version control system client tool 116 might provide such a request to the DVCS 102, or another component, along with a copy 122 of the source control object store 104 that includes modified source code objects 106 and, potentially, modified software development workflow objects 112AA and 112BB. If such a request is received at operation 210, the routine 200 proceeds to operation 212.

At operation 212, the DVCS 102, or another component, updates the source control object store 104 with the modified source code objects 106A. The DVCS 102, or another component, might also update one or more software development workflow system object stores 110 with modified software development workflow objects. For example, the DVCS 102, or another component, might cause the modified software development workflow objects 112AA to be synchronized with the contents of the software development workflow system object store 110A. Similarly, the DVCS 102, or another component, might cause the modified software development workflow objects 112BB to be synchronized with the contents of the software development workflow system object store 110B. Additional details regarding this process will be provided below with regard to FIGS. 5 and 6. From operation 212, the routine 200 proceeds to operation 214, where it ends.

Figure 3:
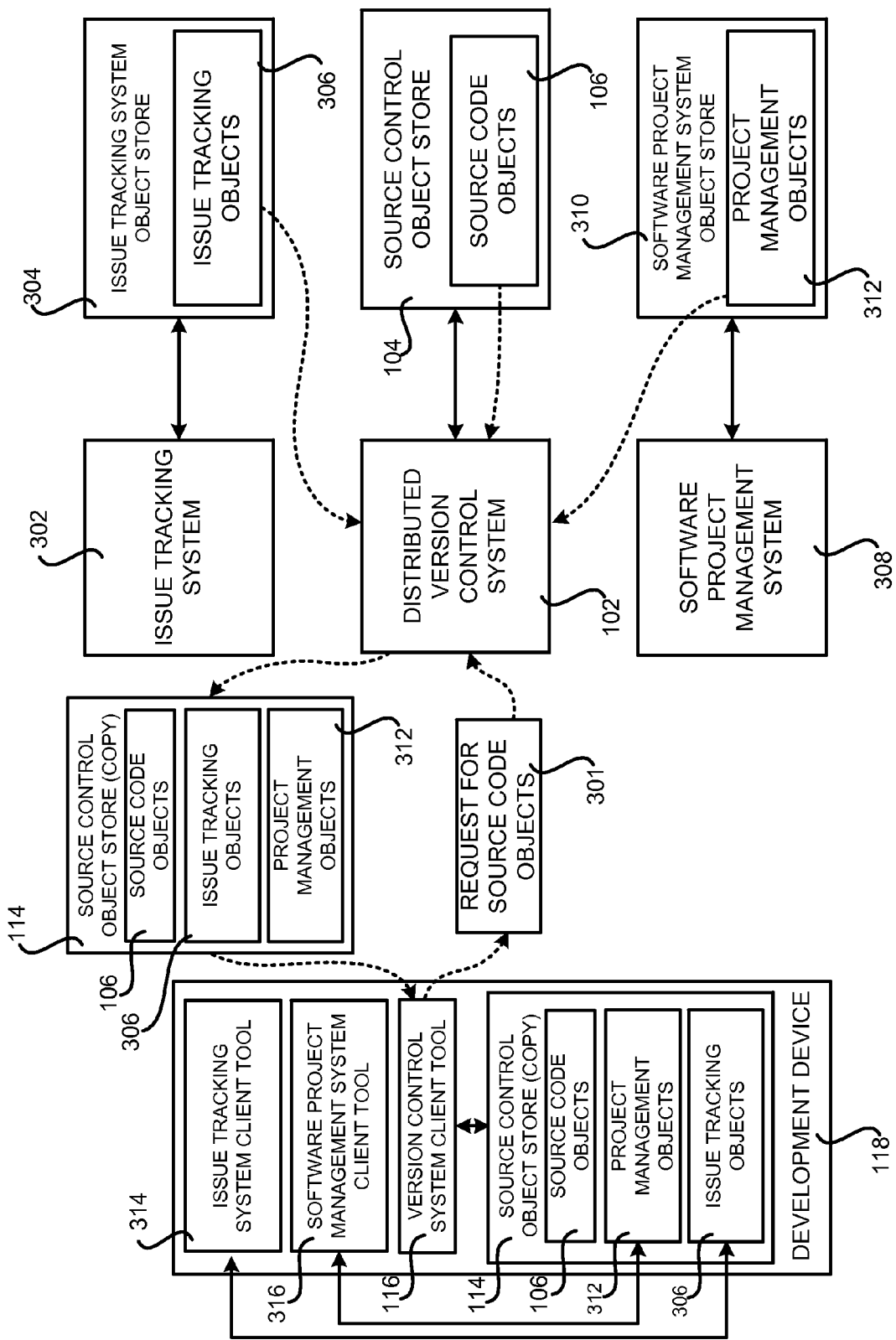
FIG. 3 is a system diagram showing aspects of a mechanism disclosed herein for synchronizing source code objects and software development workflow objects to a development device, according to one embodiment.

FIG. 3 is a system diagram showing aspects of a specific implementation of the mechanism disclosed herein for synchronizing source code objects 106 and software development workflow objects 112 to a development device 118, according to one embodiment. In the embodiment shown in FIG. 3, the DVCS 102 is utilized in conjunction with two software development workflow systems 108. In particular, the DVCS 102 is utilized in conjunction with an issue tracking system 302 and a software project management system 308. As mentioned above, the DVCS 102 might be utilized in conjunction with other types of software development workflow systems 108 in other embodiments, such as a software deployment system that provides functionality for deploying software to one or more computers and/or virtual machine instances.

As mentioned briefly above, the issue tracking system 302 provides functionality for tracking issues within a program. In this regard, the issue tracking system 302 may store issue tracking objects 306 containing data and/or metadata relating to issues in a program in an issue tracking system object store 304. In some embodiments, the issue tracking objects 306 contain data and/or metadata regarding issues within source code maintained by the DVCS 102. Example issue tracking systems include, but are not limited to, the JIRA issue and project tracking system from ATLASSIAN, the TRAQ project management system from TRAQ.IO, the BUGZILLA software development system, and the RT: REQUEST TRACKER issue tracking system from BEST PRACTICAL SOLUTIONS, INC.

As also mentioned briefly above, the software project management system 308 provides functionality for managing a development timeline and other aspects of the development of a program. The software project management system 308 may store project management objects 312 containing data and/or metadata relating to the management of a software project in a software project management system object store 310. In some embodiments, the project management objects 312 contain data and/or metadata regarding the management of a software project having source code objects 106 maintained by the DVCS 102. Example software project management systems include, but are not limited to, the JIRA issue and project tracking system from ATLASSIAN, the TRAQ project management system from TRAQ.IO, the BASECAMP project management system from 37 SIGNALS, LLC, the PROJECT management application from MICROSOFT, INC., and the RATIONAL ROSE project management tool from IBM, INC.

In order to utilize the source code objects 106, the issue tracking objects 306, and the project management objects 312 in an offline mode of operation, a developer might utilize the version control system client tool 116, or another component, to transmit a request 301 for a copy 114 of the source control object store 114 that includes all or a subset of the source code objects 106 contained in the source control object store 104. In response thereto, the DVCS 102, or another component, may create the copy 114 of the source control object store 104 containing the requested source code objects 106. Additionally, the DVCS 102, or another component, might also be configured to identify issue tracking objects 306 maintained by the issue tracking system 302 that are related in some manner to the requested source code objects 106. For example, and without limitation, the identified issue tracking objects 306 might include data and/or metadata corresponding to issues in source code within or referenced by the requested source code objects 106.

The DVCS 102, or another component, might also be configured to identify project management objects 312 maintained by the software project management system 308 that are related in some manner to the requested source code objects 106. For example, and without limitation, the identified project management objects 312 might include data and/or metadata corresponding to the management of source code within or referenced by the requested source code objects 106. The DVCS 102, or another component, might also be configured to identify other types of objects maintained by other types of software development workflow systems 108 that are related to or otherwise associated with the requested source code objects 106.

Once one or more issue tracking objects 306 and/or project management objects 312 have been identified that are associated with requested source code objects 106, the DVCS 102, or another component, may retrieve the identified issue tracking objects 306 and/or project management objects 312 and store the objects 306 and 312 in the copy 114 of the source control object store 104 that is to be provided to the development device 118 in response to the request 301. In this way, the copy 114 of the source control object store 104 is generated that includes both source code objects 106 from the source control object store 104 and issue tracking objects 306 and/or project management objects 312. The DVCS 102 or another component may then transmit the copy 114 of the source control object store 104 to the development device 118 for offline use. As illustrated in FIG. 3, the development device 118 receives and stores the copy 114 of the source control object store 104 in a locally available storage device.

As also shown in FIG. 1, the development device 118 might also be configured with software tools for modifying and otherwise utilizing the source code objects 106, the issue tracking objects 306, and/or the project management objects 312. For example, and as shown in FIG. 3, the development device 118 might include a version control system client tool 116 that provides functionality for utilizing the source code objects 106 stored in the local copy 114 of the source control object store 104.

The development device 118 might also include an issue tracking system client tool 314 for utilizing the issues tracking objects 306 stored in the local copy 114 of the source control object store 104. Similarly, the development device 118 might also include a software project management system client tool 316 for utilizing the project management objects 312 stored in the local copy 114 of the source control object store 104. The tools 116, 314 and 316 may be configured to permit the utilization of the contents of the copy 114 of the source control object store 104 even when a network connection cannot be established to the DVCS 102, the issue tracking system 302, or the software project management system 102.

As mentioned briefly above, the version control system client tool 116 might also be configured to utilize and/or modify software development workflow objects 112. For instance, in the example shown in FIG. 3, the version control system client tool 116 might be utilized in the manner described above to obtain and modify one or more source code objects 106. If an issue exists in the source code objects 106, the version control system client tool 116 might also be utilized to modify the corresponding issue tracking objects 306 for the issue. Similarly, the version control system client tool 116 might also be utilized to update and project management objects 312 associated with the source code objects 106. In other implementations, the version control system client tool 116 might also be utilized to modify other types of software development workflow objects 112.

Figure 4:
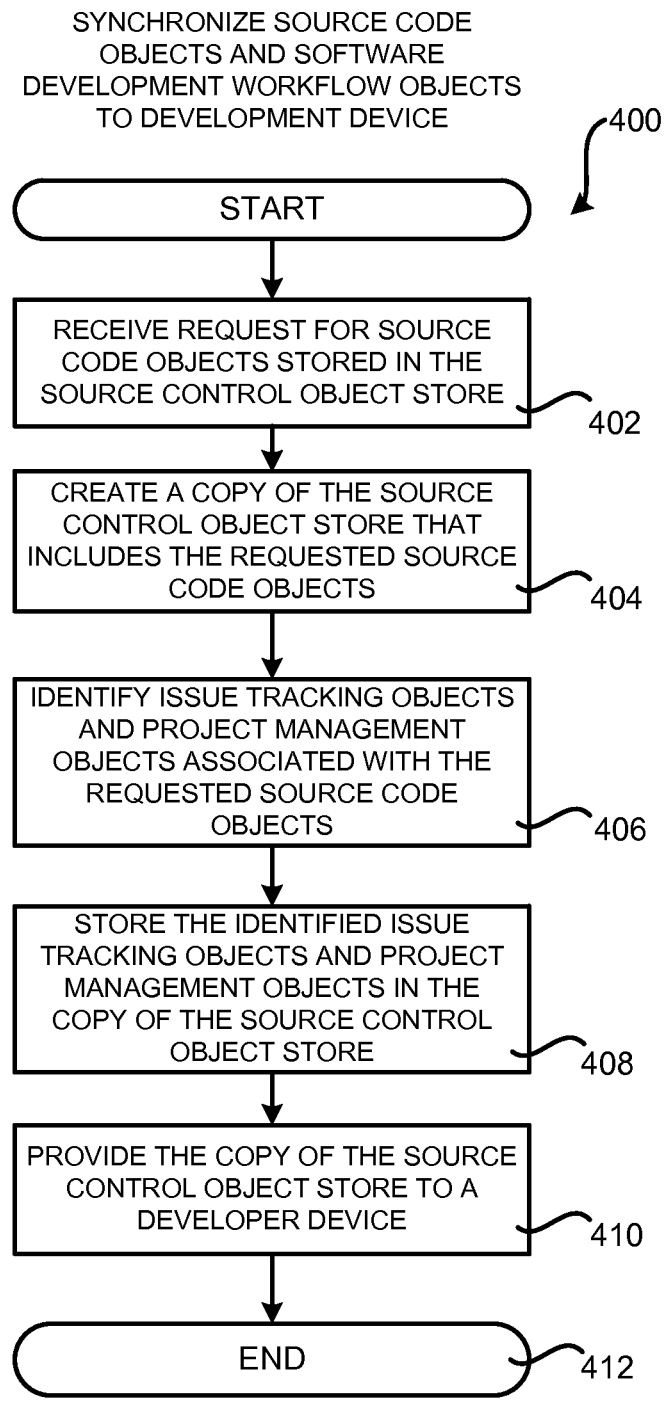
FIG. 4 is a flow diagram showing aspects of one routine disclosed herein for synchronizing source code objects and software development workflow objects to a development device.

FIG. 4 is a flow diagram showing aspects of one routine 400 disclosed herein for synchronizing source code objects 106 and software development workflow objects 112 to a development device 118. The routine 400 begins at operation 402, where the DVCS 102, or another related component, receives a request 301 for one or more source code objects 106 stored in the source control object store 104. As mentioned above, the version control system client tool 116 executing on the development device 118 may be utilized to provide such a request 301 to the DVCS 102.

In response to receiving the request 301 at operation 402, the routine 400 proceeds from operation 402 to operation 404, where the DVCS 102, or another component, creates the copy 114 of the source control object store 104 that includes the requested source code objects 106. The routine 400 then proceeds to operation 406, where the DVCS 102, or another component, identifies one or more issue tracking objects 306 and/or project management objects 312 that are related to the requested source code objects 106.

An issue tracking system for a large organization may include as many as millions of issues related to a software project. Transferring all issues in response to a request may be inefficient and time consuming. In some implementations, related issues may be selectively identified based on the specificity and relevance with which they indicate software development activities that may be performed on the requested source code objects. For example, an issue that includes a stack trace indicating a particular source code file contained in the source code objects would be a higher priority to transfer than an issue that only specified a module or component containing the source code file. As another example, an issue indicating work that can be performed now would be a higher priority to transfer than an issue that is blocked waiting for other work to be performed.

In some implementations, all of the issue tracking objects 306 and/or project management objects 312 that are related to the requested source code objects 106 are identified and provided in response to a request 301. In other embodiments, however, various mechanisms might be utilized to identify a subset of the related issue tracking objects 306 and/or project management objects 312 to be provided in response to the request 301. For example, and without limitation, only issue tracking objects 306 and/or project management objects 312 related to the requested source code objects 106 and that have changed since a previous request for the source code objects may be provided. As another example, issue tracking objects 306 and/or project management objects 312 related to the requested source code objects 106 and that have been created or modified recently (e.g. created or modified within some threshold period of time prior to the receipt of the request 301) may be provided. As yet another example, only issue tracking objects 306 and/or project management objects 312 related to the requested source code objects 106 and that have not previously been transmitted to the development device 118 may be provided. Other mechanisms might also be utilized to identify the subset of the related issue tracking objects 306 and/or project management objects 312 to be provided in response to the request 301. Moreover, the objects 306 and 312 to be provided in response to the request 301 might be identified by the DVCS 102, the issue tracking system 302, the software project management system 308, or another system or combination of systems. Once the objects 306 and 312 to be provided in response to the request 301 have been identified, the routine 400 proceeds from operation 406 to operation 408.

At operation 408, the DVCS 102, or another component, stores the issue tracking objects 306 and/or project management objects 312 identified at operation 406 in the copy 114 of the source control object store 104 that includes the requested source code objects 106. According to various embodiments, various mechanisms might be utilized to store the identified issue tracking objects 306 and/or project management objects 306 in the copy 114 of the source control object store 104. For example, and without limitation, software development workflow objects 112 might be encoded as source code objects 106. In this way, source code objects 106 can be created in a particular format that allows issue tracking objects 306 and/or project management objects 312 to be stored therein. A commit might be generated to the copy 114 of the source control object store 104, for instance, that contains content corresponding to an issue maintained by the issue tracking system 302. Another file in the same directory might similarly be created that describes a log of activity on the particular issue.

One or more namespaces may be assigned to objects in the copy 114 of the source control object store 104 in order to distinguish source code objects 106 from software development workflow objects 112 that have been encoded as source code objects 106 in the copy 114 of the source control object store 104. In this way, the version control system client tool 116 can distinguish between actual source code objects 106 and software development workflow objects 112 that have been encoded as source code objects 106. Other mechanisms might also be utilized in order to distinguish between software development workflow objects 112 and source code objects 106 stored in the copy 114 of the source control object store 104 utilized by a development device 118.

From operation 408, the routine 400 proceeds to operation 410, where the DVCS 102, or another component, provides the copy 114 of the source control object store 104 in response to the request 301 received at operation 402. For example, the DVCS 102 might provide the copy 114 of the source control object store 104 to the version control system client tool 116 for local storage on the development device 118. The routine 400 then proceeds from operation 410 to operation 412, where it ends.

Figure 5:
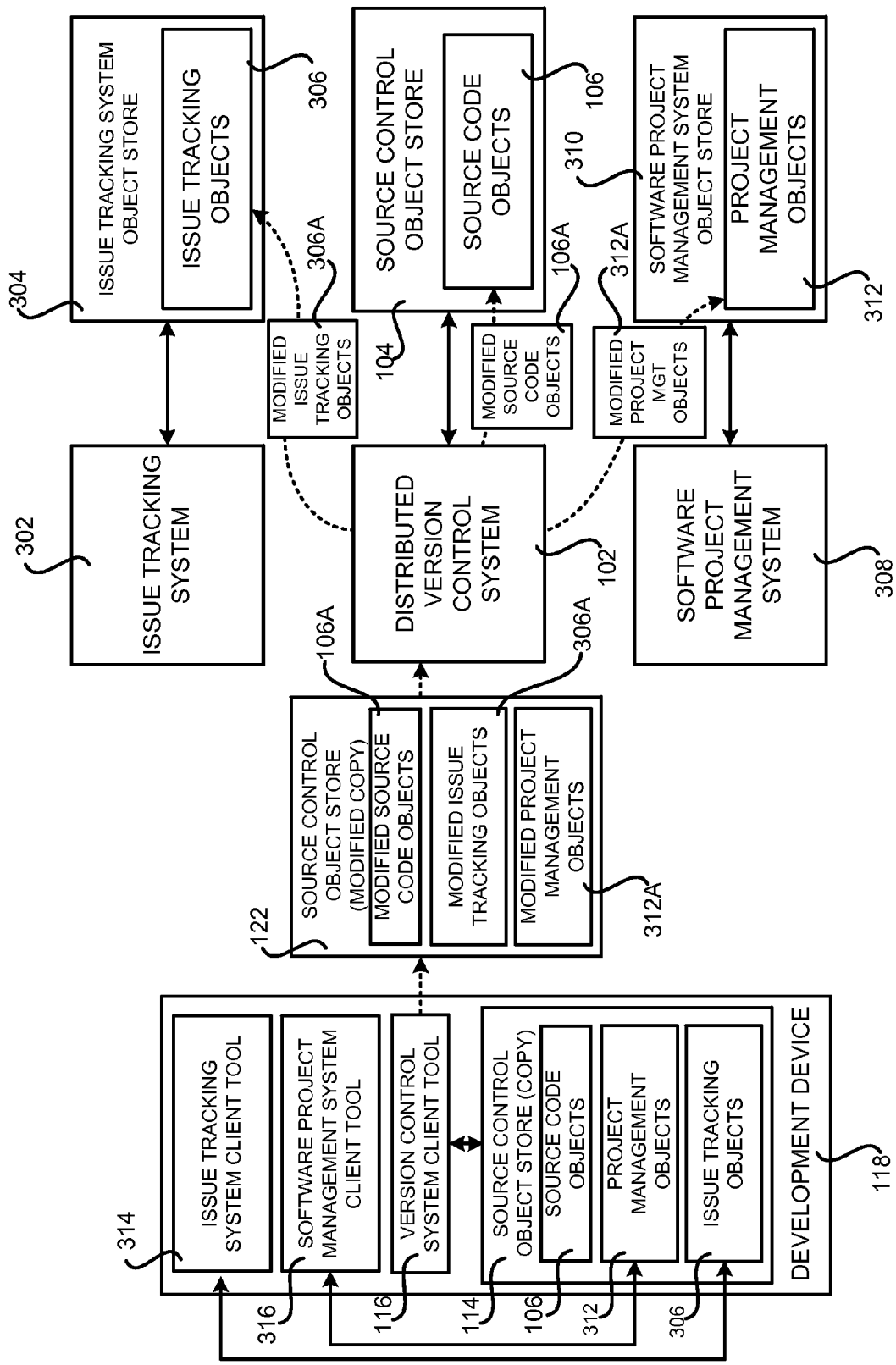
FIG. 5 is a system diagram showing aspects of a mechanism disclosed herein for synchronizing source code objects and software development workflow objects from a development device, according to one embodiment.

FIG. 5 is a system diagram showing aspects of a mechanism disclosed herein for synchronizing source code objects 106, project management objects 312, and issue tracking objects 306 received from a development device 118, according to one embodiment. As described above, software tools may be executed on the development device 118 for utilizing and, potentially modifying, the source code objects 106, the project management objects 312, and the issues tracking objects 306 stored in the copy 114 of the source control object store 114 maintained at the development device 118. For example, the version control system client tool 116 may be utilized to modify the source code objects 106. Similarly, an issue tracking system client tool 314 may be executed in order to utilize the issue tracking objects 306. A software project management system client tool 316 may be executed in order to utilize the project management objects 312.

Changes made to the contents of the copy 114 of the source control object store 104 can also be synchronized back to their respective object stores. In particular, the development device 118 might provide a copy 122 of the source control object store 104 containing modified source code objects 106A, modified issue tracking objects 306A, and modified project management objects 312A to the DVCS 102 or another component configured to synchronize the changes to these objects to the appropriate object store.

In response to receiving the copy 122 of the source control object store 104 from the development device 118, the DVCS 102, or another component, may merge the modified source code objects 106A into the original source control object store 104. Similarly, the DVCS 102, or another component, might also merge the modified issue tracking objects 306A into the issue tracking system object store 304. The DVCS, or another component, might also merge the modified project management objects 312A into the software project management system object store 310.

It should be appreciated that although FIG. 3 illustrates the DVCS 102 as receiving the copy 122 of the source control object store 104 from the development device 118, other systems and/or components might also perform this functionality. In some embodiments, for example, the version control system client tool 116 or another component on the development device 118 might be configured to push the modified issue tracking objects 306A and the modified project management objects 312 into the appropriate object store. Other configurations might also be utilized.

In one example scenario, the version control system client tool 116 might be utilized to created and/or modify source code having an associated issue being tracked by the issue tracking system 302. In this example, the version control system client tool 116 might be utilized to record a commit (i.e. a change) to source code stored in the source control object store 114 associated with the issue. In response thereto, the issue tracking system client tool 314 might create and/or update one or more issue tracking objects 306 stored in the copy 114 of the source control object store 104 indicating that the issue has been addressed. The new or modified issue tracking objects 306 (and the modified source code objects 106) can later be synchronized back to the issue tracking system 302 for retroactive inclusion in the issue tracking system object store 304 in the manner described herein. It should be appreciated that this scenario is merely illustrative and other usage scenarios might be enabled by the various technologies described herein.

Figure 6:
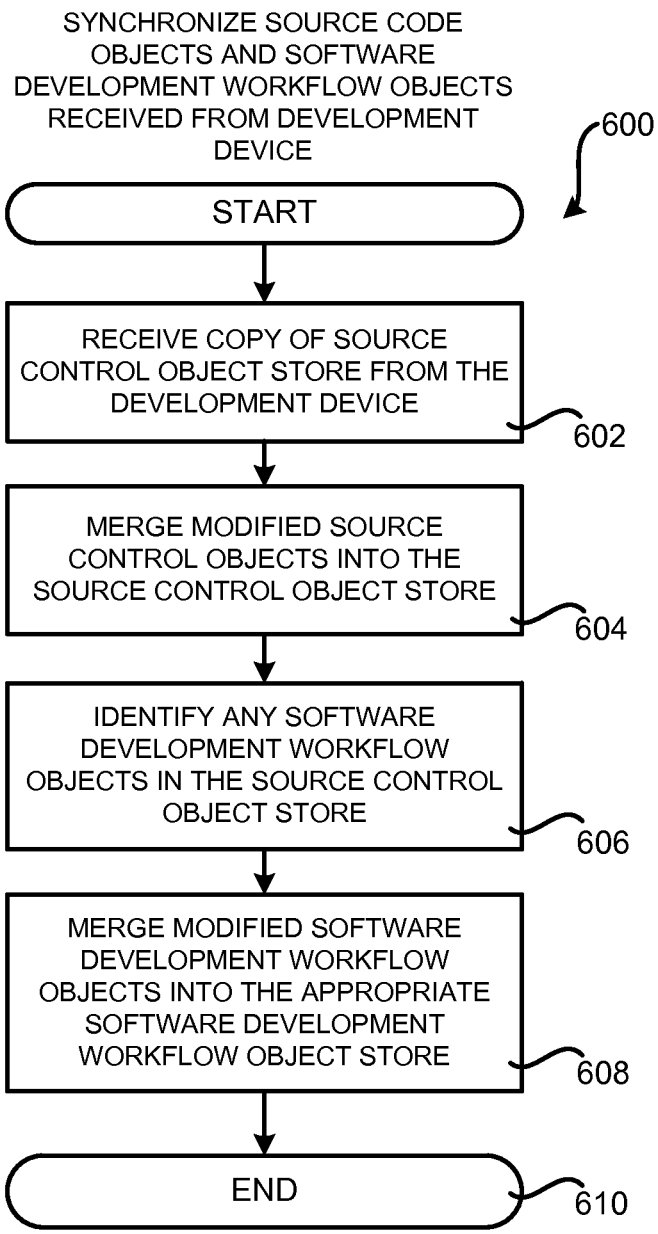
FIG. 6 is a flow diagram showing aspects of one routine disclosed herein for synchronizing source code objects and software development workflow objects from a development device.

FIG. 6 is a flow diagram showing aspects of one routine 600 disclosed herein for synchronizing source code objects 106 and software development workflow objects 112 from a development device 118. The routine 600 begins at operation 602, where the DVCS 102, or another system or component, receives the copy 122 of the source control object store 104 that includes modified source code objects 106A, modified issue tracking objects 306A, and modified project management objects 312A.

From operation 602, the routine 600 proceeds to operation 604, where the DVCS 102, or another component, updates the source control object store 104 with the modified source code objects 106A. From operation 604, the routine 600 proceeds to operation 606, where the DVCS 102 or another component determines whether the copy 122 of the source control object store 104 includes any modified issue tracking objects 306A or modified project management objects 312A.

If the copy 122 of the source control object store 104 includes modified issue tracking objects 306A or modified project management objects 312A, the DVCS 122 synchronizes the modified issue tracking objects 306A and/or modified project management objects 312A into the appropriate object store. As discussed above, for example, the modified issue tracking objects 306A may be merged into the issue tracking system object store 304. Similarly, any modified project management objects 312A may be merged into the software project management system object store 310. Other types of modified objects in the copy 122 of the source control object store 104 might also be synchronized with other object stores in a similar manner.

Additionally, modified issue tracking objects 306A and/or modified project management objects 312A might be processed in other ways during the synchronization operation. For example, and without limitation, these objects might be converted, translated, or modified in other ways prior to synchronization to the respective object store. From operation 608, the routine 600 proceeds to operation 610, where it ends.

Figure 7:
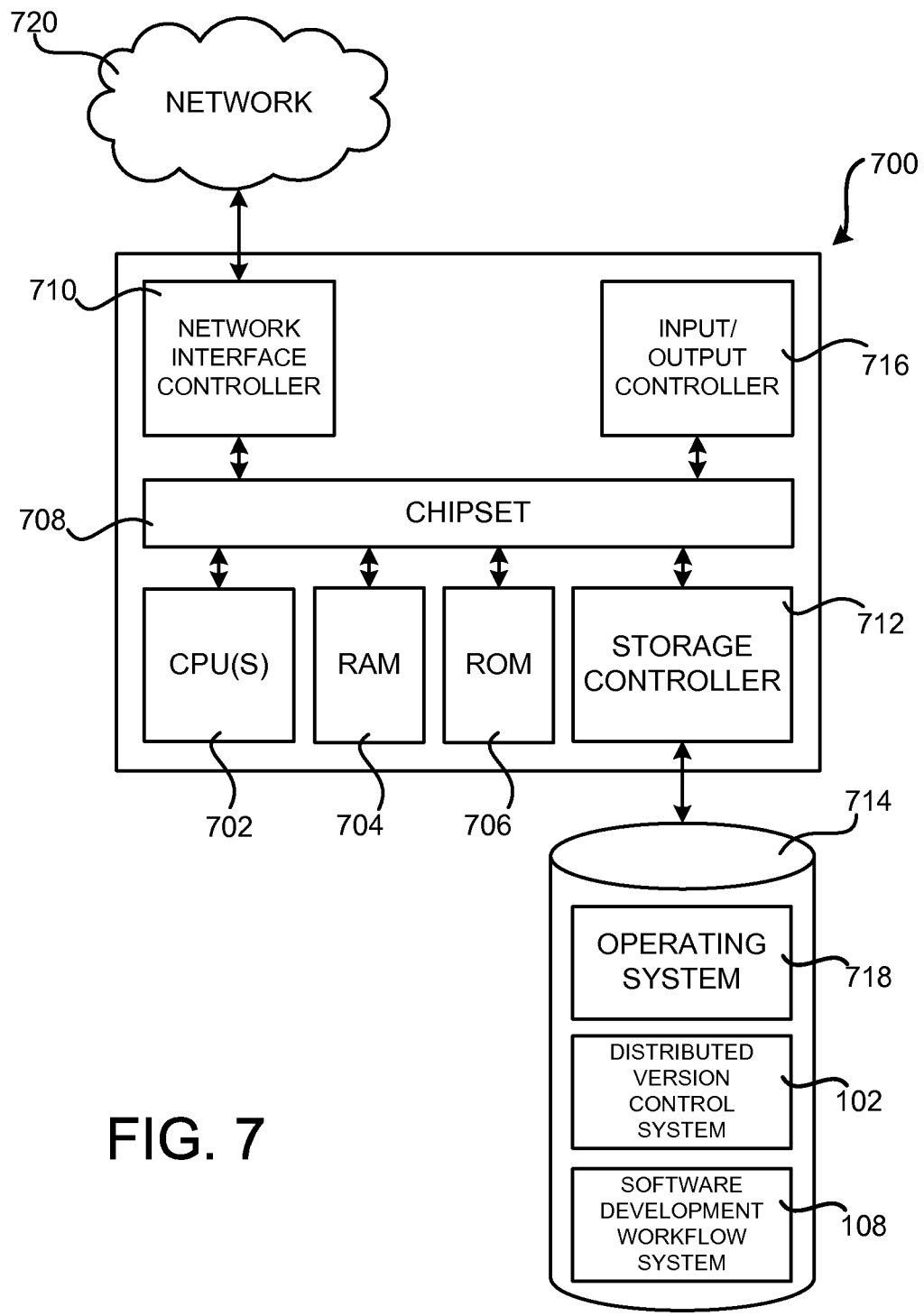
FIG. 7 is a computer architecture diagram showing an illustrative computer hardware architecture for computing devices described in embodiments presented herein.

FIG. 7 shows an example computer architecture for a computer 700 capable of executing the software components described herein for synchronizing source code objects 106 and software development workflow objects 112, in the manner presented above. The computer architecture shown in FIG. 7 illustrates a conventional server computer, workstation, desktop computer, laptop, network appliance, personal digital assistant ("PDA"), electronic book reader, digital cellular phone, or other computing device, and may be utilized to execute any aspects of the software components presented herein. For example, and without limitation, the computer architecture shown in FIG. 7 might be utilized to implement the development device 118 and/or computer systems that implement the DVCS 102 and/or the software development workflow systems 108.

The computer 700 includes a baseboard, or "motherboard," which is a printed circuit board to which a multitude of components or devices may be connected by way of a system bus or other electrical communication paths. In one illustrative embodiment, one or more central processing units ("CPUs") 702 operate in conjunction with a chipset 708. The CPUs 702 are standard programmable processors that perform arithmetic and logical operations necessary for the operation of the computer 700.

The CPUs 702 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 708 provides an interface between the CPUs 702 and the remainder of the components and devices on the baseboard. The chipset 708 may provide an interface to a random access memory ("RAM") 704, used as the main memory in the computer 700. The chipset 708 may further provide an interface to a computer-readable storage medium such as a read-only memory ("ROM") 706 or non-volatile RAM ("NVRAM") for storing basic routines that help to startup the computer 700 and to transfer information between the various components and devices. The ROM 706 or NVRAM may also store other software components necessary for the operation of the computer 700 in accordance with the embodiments described herein.

According to various embodiments, the computer 700 may operate in a networked environment using logical connections to remote computing devices and computer systems through the network 720, such as a local-area network ("LAN"), a wide-area network ("WAN"), the Internet, or any other networking topology known in the art that connects the computer 700 to remote computers. The chipset 708 includes functionality for providing network connectivity through a network interface controller ("NIC") 710, such as a gigabit Ethernet adapter. The NIC 710 is capable of connecting the computer 700 to other computing devices over the network 720. It should be appreciated that any number of NICs 710 may be present in the computer 700, connecting the computer 700 to various types of networks and remote computer systems.

The computer 700 may be connected to a mass storage device 714 that provides non-volatile storage for the computer 700. The mass storage device 714 may store system programs, application programs, other program modules, and data, which are described in greater detail herein. The mass storage device 714 may be connected to the computer 700 through a storage controller 712 connected to the chipset 708. The mass storage device 714 may consist of one or more physical storage units. The storage controller 712 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 700 may store data on the mass storage device 714 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 714 is characterized as primary or secondary storage, and the like. For example, the computer 700 may store information to the mass storage device 714 by issuing instructions through the storage controller 712 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 714 by detecting the physical states or characteristics of one or more particular locations within the physical storage units.

In addition to the mass storage device 714 described above, the computer 700 may have access to other computer-readable storage media to store and retrieve information, such as program modules, data structures, or other data. It should be appreciated by those skilled in the art that computer-readable storage media can be any available non-transitory media that may be accessed by the computer 700. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 714 may store an operating system 718 utilized to control the operation of the computer 700. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 714 may store other system or application programs and data utilized by the computer 700, such as a DVCS 102 and/or a software development workflow system 108, each of which was described above in regard to FIGS. 1-6.

In one embodiment, the mass storage device 714 or other computer-readable storage media may be encoded with computer-executable instructions that, when loaded into the computer 700, may transform the computer from a general-purpose computing system into a special-purpose computer capable of implementing the embodiments described herein. These computer-executable instructions transform the computer 700 by specifying how the CPUs 702 transition between states, as described above. According to one embodiment, the computer 700 may have access to computer-readable storage media storing computer-executable instructions that, when executed by the computer, perform the routines 200, 400 and 600 described above with regard to FIGS. 2, 4 and 6, respectively.

The computer 700 might also include an input/output controller 716 for receiving and processing input from a number of input devices, such as a keyboard, the mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that concepts and technologies synchronizing source code objects 106 and software development workflow objects 112 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A system for synchronizing source code objects and software development workflow objects between a first computing device and a second computing device, the system comprising:
   a first computing device configured to:
      maintain at least one store for storing a plurality of source code objects and a plurality of software development workflow objects, wherein the plurality of software development workflow objects are associated with one or more software development workflow systems,
   in response to receiving a request from the second computing device:
      obtain one or more source code objects of the plurality of source code objects from the at least one store,
      identify, among one or more software development workflow objects in the at least one store that are related to the one or more source code objects, a subset of the one or more software development workflow objects, wherein the subset comprises one or more software development workflow objects that have changed following a previous request for the one or more source code objects,
      obtain the subset of the one or more software development workflow objects from the at least one store,
      store the one or more source code objects and the subset of the one or more software development workflow objects in a copy of the at least one store, and
      provide the copy of the at least one store to the second computing device,
      receive a modified copy of the at least one store containing modified one or more source code objects and modified one or more software development workflow objects from the second computing device,
      merge the modified one or more source code objects into the at least one store, and
      provide the modified one or more software development workflow objects to the one or more software development workflow systems.

2. The system of claim 1, wherein the second computing device is configured to:
   receive the copy of the at least one store containing the one or more source code objects and the subset of the one or more software development workflow objects from the first computing device;
   execute one or more software tools for modifying the one or more source code objects and the subset of the one or more software development workflow objects contained in the copy of the at least one store to create a modified copy of the at least one store; and
   provide the modified copy of the at least one store containing modified source code objects and modified software development workflow objects to the first computing device.

3. The system of claim 1, wherein store the subset of the one or more software development workflow objects in the copy of the at least one store comprises encoding the subset of the one or more software development workflow objects as source code objects and storing the encoded software development workflow objects in the copy of the at least one store.

4. The system of claim 1, wherein the first computing device is further configured to assign a namespace to the subset of the one or more software development workflow objects in the copy of the at least one store to distinguish the subset of the one or more software development workflow objects from the one or more source code objects.

5. The system of claim 2, wherein the one or more software tools executed by the second computing device for modifying the one or more source code objects and the subset of the one or more software development workflow objects contained in the copy of the at least one store comprise one or more of an issue tracking system client tool and a software project management system client tool.

6. The system of claim 2, wherein at least one of the one or more software tools executed by the second computing device for modifying the one or more source code objects and the subset of the one or more software development workflow objects contained in the copy of the at least one store comprises a version control system client tool configured for modifying the subset of the one or more software development workflow objects.

7. The system of claim 1, wherein the subset of the one or more software development workflow objects comprises at least one issue tracking object and at least one project management object.

8. A non-transitory computer-readable storage medium having computer-executable instructions stored thereon which, when executed by a computer, cause the computer to:
   send, to a device, in response to receiving a request from the device, a copy of a source control object store containing one or more source code objects and a subset of one or more software development workflow objects, wherein the subset is identified among a plurality of software development workflow objects that are related to the one or more source code objects, the subset comprising one or more software development workflow objects that have changed following a previous request for the one or more source code objects;
   receive, from the device, a modified copy of the source control object store containing modifications to the one or more source code objects and modifications to the one or more software development workflow objects of the subset;
   cause the modifications to the one or more source code objects to be merged into the source control object store; and
   cause the modifications to the one or more software development workflow objects of the subset to be merged into one or more software development system object data stores maintained by one or more software development workflow systems.

9. The non-transitory computer-readable storage medium of claim 8, having further computer-executable instructions stored thereon which, when executed by the computer, cause the computer to:

in response to the request,
identify, among the plurality of software development workflow objects that are related to the one or more source code objects, the subset of the one or more software development workflow objects,
obtain the subset of the one or more software development workflow objects, and
store one or more source code objects identified in the request and the subset of the one or more software development workflow objects in the copy of the source control object store.

10. The non-transitory computer-readable storage medium of claim 9, wherein the identify the subset comprises identify one or more software development workflow objects that have been created or modified within a threshold period of time prior to receiving the request.

11. The non-transitory computer-readable storage medium of claim 9, wherein the identify the subset comprises identify one or more software development workflow objects that have not been previously provided to a development device submitting the request.

12. The non-transitory computer-readable storage medium of claim 9, wherein store the requested one or more source code objects and the subset of the one or more software development workflow objects in the copy of the source control object store comprises encoding the subset of the one or more software development workflow objects as source code objects and storing the encoded subset of the one or more software development workflow objects in the copy of the source control object store.

13. The non-transitory computer-readable storage medium of claim 12, wherein store the requested one or more source code objects and the subset of the one or more software development workflow objects in the copy of the source control object store further comprises assigning a namespace to the encoded subset of the one or more software development workflow objects in the copy of the source control object store to distinguish the one or more software development workflow objects from the one or more source code objects.

14. The non-transitory computer-readable storage medium of claim 13, wherein the subset of the one or more software development workflow objects comprises one or more of: software deployment objects created by a software deployment system, project management objects created by a software project management system, and issue tracking objects created by an issue tracking system.

15. The non-transitory computer-readable storage medium of claim 9, wherein obtain the subset of the one or more software development workflow objects comprises selecting software development workflow objects that specify software development activities that may be performed on at least a portion of the requested one or more source code objects from the one or more software development workflow systems.

16. A computer-implemented method for synchronizing source code objects and software development workflow objects, comprising:

receiving, from a device, in response to sending a request to the device, a source control object store containing one or more source code objects and a subset of one or more software development workflow objects among a plurality of software development workflow objects that are related to the one or more source code objects, the subset comprising one or more software development workflow objects that have changed following a previous request for the one or more source code objects;
modifying the one or more source code objects and the one or more software development workflow objects of the subset contained in the source control object store using one or more software tools to create a modified source control object store; and
sending, to the device, the modified source control object store to cause the modified one or more software development workflow objects of the subset contained in the modified source control object store to be synchronized to one or more software development workflow systems.

17. The computer-implemented method of claim 16, wherein at least one of the one or more software development workflow systems comprises an issue tracking system, wherein at least one of the software development workflow objects of the subset comprises an issue tracking object created by the issue tracking system, and wherein at least one of the one or more software tools is configured for modifying issue tracking objects created by the issue tracking system.

18. The computer-implemented method of claim 16, wherein at least one of the one or more software tools comprises a version control system client tool configured for modifying the source code objects and the software development workflow objects.

19. The computer-implemented method of claim 16, wherein at least one of the one or more software development workflow systems comprises a project management system, and wherein at least one of the software development workflow objects of the subset comprises a project management object created by the project management system.

20. The computer-implemented method of claim 19, wherein at least one of the one or more software tools is configured for modifying project management objects created by the project management system.

21. The computer-implemented method of claim 16, wherein at least one of the one or more software development workflow systems comprises a software deployment system, wherein at least one of the software development workflow objects of the subset comprises a software deployment object created by the software deployment system, and wherein at least one of the one or more software tools is configured for modifying software deployment objects created by the software deployment system.

* * * * *